US011600144B2

(12) United States Patent
Trombetta et al.

(10) Patent No.: US 11,600,144 B2
(45) Date of Patent: Mar. 7, 2023

(54) CREATION OF WINNER TOURNAMENTS WITH FANDOM INFLUENCE

(71) Applicant: SONY INTERACTIVE ENTERTAINMENT LLC, San Mateo, CA (US)

(72) Inventors: Steven Trombetta, San Mateo, CA (US); Christopher Thielbar, San Francisco, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 13 days.

(21) Appl. No.: 17/080,580

(22) Filed: Oct. 26, 2020

(65) Prior Publication Data
US 2021/0043044 A1 Feb. 11, 2021

Related U.S. Application Data

(63) Continuation of application No. 15/908,707, filed on Feb. 28, 2018, now Pat. No. 10,818,142.

(51) Int. Cl.
*A63F 13/79* (2014.01)
*G07F 17/32* (2006.01)
*A63F 13/73* (2014.01)
*A63F 13/352* (2014.01)
(Continued)

(52) U.S. Cl.
CPC ........ *G07F 17/3276* (2013.01); *A63F 13/352* (2014.09); *A63F 13/73* (2014.09); *A63F 13/798* (2014.09); *A63F 13/86* (2014.09)

(58) Field of Classification Search
CPC ...... A63F 13/795; A63F 13/352; A63F 13/73; A63F 13/798; A63F 13/86; A63F 13/45; A63F 13/60; A63F 13/70; A63F 13/79; A63F 13/87
See application file for complete search history.

(56) References Cited

U.S. PATENT DOCUMENTS

| 5,729,471 A | 3/1998 | Jain et al. |
| 5,995,518 A | 11/1999 | Burns et al. |
| 6,415,317 B1 | 7/2002 | Yelon et al. |

(Continued)

FOREIGN PATENT DOCUMENTS

| CN | 110201395 A | 9/2019 |
| CN | 110201398 A | 9/2019 |

(Continued)

OTHER PUBLICATIONS

NAHL ranked #1 by The Junior Hockey News_North American Hockey League_NAHL.pdf, http://nahl.com/news/story.cfm?id=15090, Jul. 16, 2015 (Year: 2015).

(Continued)

*Primary Examiner* — David L Lewis
*Assistant Examiner* — Shauna-Kay Hall
(74) *Attorney, Agent, or Firm* — Polsinelli LLP

(57) ABSTRACT

Methods and systems directed towards creation of winner tournaments that select and facilitate eligible remote users to compete with the professionals even if the remote user is not at the live e-sport event venue. Remote users are introduced into the live e-sport event for the purpose of also competing against competitive players as well as being introduced as an exhibition match with the professionals, such as fans of the professionals selected based on social media or gameplay statistics.

19 Claims, 4 Drawing Sheets

(51) Int. Cl.
   *A63F 13/798*   (2014.01)
   *A63F 13/86*    (2014.01)

(56) References Cited

U.S. PATENT DOCUMENTS

| | | |
|---|---|---|
| 6,546,421 B1 | 4/2003 | Wynblatt et al. |
| 6,631,522 B1 | 10/2003 | Erdelyi |
| 6,877,134 B1 | 4/2005 | Fuller et al. |
| 7,499,475 B2 | 3/2009 | Kashiwagi et al. |
| 8,025,572 B2 | 9/2011 | Spanton et al. |
| 8,187,104 B2 | 5/2012 | Pearce |
| 8,202,167 B2 | 6/2012 | Ackely et al. |
| 8,645,844 B1 | 2/2014 | Strobel et al. |
| 8,702,520 B2 | 4/2014 | Seelig et al. |
| 9,216,356 B2 | 12/2015 | Grier |
| 9,233,305 B2 | 1/2016 | Laakkonen et al. |
| 9,433,855 B1 | 9/2016 | Keeker et al. |
| 9,473,825 B2 | 10/2016 | Gossweiler et al. |
| 9,479,602 B1 | 10/2016 | Paradise et al. |
| 9,497,424 B2 | 11/2016 | Kosseifi et al. |
| 9,782,678 B2 | 10/2017 | Long et al. |
| 9,814,987 B1 | 11/2017 | Lawson |
| 9,860,477 B2 | 1/2018 | Kummer et al. |
| 9,871,997 B2 | 1/2018 | Kosseifi et al. |
| 9,968,856 B1 | 5/2018 | Ninoles et al. |
| 10,277,813 B1 | 4/2019 | Thomas et al. |
| 10,471,360 B2 | 11/2019 | Trombetta |
| 10,751,623 B2 | 8/2020 | Trombetta |
| 10,765,938 B2 | 9/2020 | Trombetta |
| 10,765,957 B2 | 9/2020 | Trombetta |
| 10,792,576 B2 | 10/2020 | Trombetta |
| 10,792,577 B2 | 10/2020 | Trombetta |
| 10,814,228 B2 | 10/2020 | Trombetta |
| 10,818,142 B2 | 10/2020 | Trombetta |
| 10,953,322 B2 | 3/2021 | Trombetta |
| 10,953,335 B2 | 3/2021 | Thielbar |
| 11,065,548 B2 | 7/2021 | Trombetta |
| 11,241,630 B2 | 2/2022 | Trombetta |
| 11,426,654 B2 | 8/2022 | Trombetta |
| 11,439,918 B2 | 9/2022 | Trombetta |
| 11,439,919 B2 | 9/2022 | Trombetta |
| 11,452,943 B2 | 9/2022 | Trombetta |
| 2002/0034980 A1 | 3/2002 | Lemmons et al. |
| 2002/0107040 A1 | 8/2002 | Crandall et al. |
| 2003/0177347 A1 | 9/2003 | Schneier et al. |
| 2003/0220143 A1 | 11/2003 | Shteyn et al. |
| 2004/0147306 A1 | 7/2004 | Randall et al. |
| 2004/0189701 A1 | 9/2004 | Badt |
| 2004/0257994 A1 | 12/2004 | Paskett et al. |
| 2004/0266535 A1 | 12/2004 | Reeves |
| 2005/0020359 A1 | 1/2005 | Ackely et al. |
| 2005/0026699 A1 | 2/2005 | Kinzer et al. |
| 2006/0105827 A1 | 5/2006 | Metzger et al. |
| 2006/0247060 A1 | 11/2006 | Hanson et al. |
| 2006/0287096 A1 | 12/2006 | O'Kelley et al. |
| 2007/0018952 A1 | 1/2007 | Arseneau et al. |
| 2007/0021058 A1 | 1/2007 | Aresneau et al. |
| 2007/0070914 A1 | 3/2007 | Abigail |
| 2007/0117617 A1 | 5/2007 | Spanton et al. |
| 2007/0117635 A1 | 5/2007 | Spanton et al. |
| 2007/0149288 A1 | 6/2007 | Nickell et al. |
| 2007/0191102 A1 | 8/2007 | Coliz et al. |
| 2007/0248261 A1 | 10/2007 | Zhou et al. |
| 2008/0079752 A1 | 4/2008 | Gates et al. |
| 2008/0113815 A1 | 5/2008 | Weingardt et al. |
| 2008/0119286 A1 | 5/2008 | Brunstetter et al. |
| 2008/0200254 A1 | 8/2008 | Cayce et al. |
| 2009/0036214 A1 | 2/2009 | Dahl |
| 2009/0042646 A1 | 2/2009 | Sarkar et al. |
| 2009/0082110 A1 | 3/2009 | Relyea et al. |
| 2009/0144448 A1 | 6/2009 | Smith |
| 2009/0208181 A1 | 8/2009 | Cottrell |
| 2009/0225828 A1 | 9/2009 | Perlman et al. |
| 2009/0271821 A1 | 10/2009 | Zalewski |
| 2010/0099330 A1 | 4/2010 | Digiovanni |
| 2010/0100512 A1 | 4/2010 | Brodin et al. |
| 2010/0240443 A1 | 9/2010 | Baerlocher et al. |
| 2011/0092282 A1 | 4/2011 | Gary |
| 2011/0207523 A1 | 8/2011 | Filipour et al. |
| 2011/0250939 A1 | 10/2011 | Hobler |
| 2011/0263332 A1 | 10/2011 | Mizrachi |
| 2011/0263333 A1 | 10/2011 | Dokei et al. |
| 2011/0275431 A1 | 11/2011 | Hirzel et al. |
| 2012/0093481 A1 | 4/2012 | McDowell et al. |
| 2012/0142411 A1 | 6/2012 | Thompson et al. |
| 2012/0283017 A1 | 11/2012 | Ahiska et al. |
| 2013/0002949 A1 | 1/2013 | Raveendran et al. |
| 2013/0007013 A1 | 1/2013 | Geisner et al. |
| 2013/0083173 A1 | 4/2013 | Geisner et al. |
| 2013/0123019 A1 | 5/2013 | Sullivan et al. |
| 2013/0231189 A1 | 9/2013 | Beeler |
| 2013/0254680 A1 | 9/2013 | Buhr et al. |
| 2013/0296051 A1 | 11/2013 | Gault et al. |
| 2013/0324239 A1 | 12/2013 | Ur et al. |
| 2013/0331192 A1 | 12/2013 | Betti et al. |
| 2014/0004951 A1 | 1/2014 | Kern et al. |
| 2014/0031121 A1 | 1/2014 | Kern et al. |
| 2014/0087846 A1 | 3/2014 | Bryan et al. |
| 2014/0087851 A1 | 3/2014 | Low et al. |
| 2014/0113718 A1 | 4/2014 | Norman et al. |
| 2014/0142921 A1 | 5/2014 | Gleadall et al. |
| 2014/0171039 A1 | 6/2014 | Bjontegard |
| 2014/0171182 A1 | 6/2014 | Versaci |
| 2014/0179440 A1 | 6/2014 | Perry |
| 2014/0228112 A1 | 8/2014 | Laakkonen et al. |
| 2014/0274307 A1 | 9/2014 | Gonzalez |
| 2014/0274368 A1 | 9/2014 | Cotter |
| 2014/0274370 A1 | 9/2014 | Shah |
| 2014/0297408 A1 | 10/2014 | Zabala |
| 2014/0331265 A1 | 11/2014 | Mozell et al. |
| 2015/0005052 A1 | 1/2015 | Harrington et al. |
| 2015/0011283 A1 | 1/2015 | Sanford et al. |
| 2015/0018990 A1 | 1/2015 | Shachar et al. |
| 2015/0024850 A1 | 1/2015 | Kokami et al. |
| 2015/0113548 A1 | 4/2015 | Stern et al. |
| 2015/0141140 A1 | 5/2015 | Lampe et al. |
| 2015/0238859 A1 | 8/2015 | Fear |
| 2015/0248792 A1 | 9/2015 | Abovitz et al. |
| 2015/0281029 A1 | 10/2015 | Callahan et al. |
| 2015/0348373 A1 | 12/2015 | Weingardt et al. |
| 2015/0375117 A1 | 12/2015 | Thompson et al. |
| 2016/0051895 A1 | 2/2016 | Hood |
| 2016/0193530 A1 | 7/2016 | Parker et al. |
| 2016/0214012 A1 | 7/2016 | Nishikawa |
| 2016/0243450 A1 | 8/2016 | Cotter |
| 2016/0253865 A1 | 9/2016 | Men et al. |
| 2016/0286244 A1 | 9/2016 | Chang et al. |
| 2016/0310843 A1 | 10/2016 | Webb |
| 2016/0365121 A1 | 12/2016 | DeCaprio |
| 2016/0373499 A1 | 12/2016 | Wagner et al. |
| 2017/0001111 A1 | 1/2017 | Willette et al. |
| 2017/0001112 A1 | 1/2017 | Gilmore et al. |
| 2017/0001122 A1 | 1/2017 | Leung et al. |
| 2017/0003740 A1 | 1/2017 | Verfaillie et al. |
| 2017/0003784 A1 | 1/2017 | Garg et al. |
| 2017/0006074 A1 | 1/2017 | Oates |
| 2017/0072324 A1 | 3/2017 | Navok et al. |
| 2017/0113143 A1 | 4/2017 | Marr |
| 2017/0157512 A1 | 6/2017 | Long et al. |
| 2017/0182426 A1 | 6/2017 | Loeb et al. |
| 2017/0209795 A1 | 7/2017 | Harvey et al. |
| 2017/0266549 A1 | 9/2017 | Paradise |
| 2017/0266552 A1 | 9/2017 | Paradise et al. |
| 2017/0270751 A1 | 9/2017 | Paradise |
| 2017/0282075 A1 | 10/2017 | Michot et al. |
| 2017/0282082 A1 | 10/2017 | Hubbard |
| 2017/0304724 A1 | 10/2017 | Cotter |
| 2017/0332131 A1 | 11/2017 | Opsenica et al. |
| 2017/0354875 A1 | 12/2017 | Marks et al. |
| 2017/0374402 A1 | 12/2017 | Pogorelik et al. |
| 2018/0001199 A1 | 1/2018 | Gary |
| 2018/0077438 A1 | 3/2018 | Hensen et al. |
| 2018/0139257 A1 | 5/2018 | Ninoles et al. |
| 2018/0167656 A1 | 6/2018 | Ortiz et al. |

(56) References Cited

U.S. PATENT DOCUMENTS

| | | |
|---|---|---|
| 2018/0192144 A1 | 7/2018 | McElroy |
| 2018/0250598 A1 | 9/2018 | Trombetta |
| 2018/0250600 A1 | 9/2018 | Trombetta |
| 2018/0367820 A1 | 12/2018 | Abulikemu |
| 2019/0099675 A1 | 4/2019 | Khan et al. |
| 2019/0102941 A1 | 4/2019 | Khan et al. |
| 2019/0118098 A1 | 4/2019 | Payzer et al. |
| 2019/0262705 A1 | 8/2019 | Trombetta |
| 2019/0262706 A1 | 8/2019 | Trombetta |
| 2019/0262712 A1 | 8/2019 | Trombetta |
| 2019/0262713 A1 | 8/2019 | Trombetta |
| 2019/0262717 A1 | 8/2019 | Thielbar |
| 2019/0262720 A1 | 8/2019 | Trombetta |
| 2019/0262723 A1 | 8/2019 | Trombetta |
| 2019/0262724 A1 | 8/2019 | Trombetta |
| 2019/0262727 A1 | 8/2019 | Trombetta |
| 2019/0266845 A1 | 8/2019 | Trombetta |
| 2020/0179812 A1 | 6/2020 | Trombetta |
| 2020/0384364 A1 | 12/2020 | Trombetta |
| 2020/0398157 A1 | 12/2020 | Trombetta |
| 2020/0398169 A1 | 12/2020 | Trombetta |
| 2020/0406152 A1 | 12/2020 | Trombetta |
| 2021/0016190 A1 | 1/2021 | Trombetta |
| 2021/0052982 A1 | 2/2021 | Trombetta |
| 2021/0178257 A1 | 6/2021 | Trombetta |
| 2021/0205711 A1 | 7/2021 | Thielbar |
| 2021/0346809 A1 | 11/2021 | Trombetta |

FOREIGN PATENT DOCUMENTS

| | | |
|---|---|---|
| CN | 110201399 A | 9/2019 |
| CN | 110201401 A | 9/2019 |
| CN | 110201402 A | 9/2019 |
| CN | 110201404 A | 9/2019 |
| CN | 110573221 A | 12/2019 |
| CN | 111971097 A | 11/2020 |
| CN | 112423854 A | 2/2021 |
| CN | 112423855 A | 2/2021 |
| CN | 112543669 A | 3/2021 |
| EP | 3 058 996 | 8/2016 |
| EP | 3 758 814 | 1/2021 |
| EP | 3 758 816 | 1/2021 |
| EP | 3 758 818 | 1/2021 |
| EP | 3 758 819 | 1/2021 |
| EP | 3 758 821 | 1/2021 |
| EP | 3 759 930 | 1/2021 |
| EP | 3 759 934 | 1/2021 |
| EP | 3 758 820 | 2/2021 |
| JP | 2001-170360 | 6/2001 |
| JP | 2007-036830 | 2/2007 |
| JP | 2011-512172 | 4/2011 |
| JP | 2011-224204 | 11/2011 |
| JP | 2012-176127 | 9/2012 |
| JP | 2021-514748 | 6/2021 |
| JP | 2021-514749 | 6/2021 |
| JP | 2021-514750 | 6/2021 |
| JP | 2021-514751 | 6/2021 |
| JP | 2021-514752 | 6/2021 |
| JP | 2021-514753 | 6/2021 |
| JP | 2021-514754 | 6/2021 |
| JP | 2021-515485 | 6/2021 |
| JP | 2021-516087 | 7/2021 |
| JP | 2021-516088 | 7/2021 |
| KR | 10-2020-0126975 | 11/2020 |
| KR | 10-2020-0127169 | 11/2020 |
| KR | 10-2020-0127172 | 11/2020 |
| KR | 10-2020-0127173 | 11/2020 |
| KR | 10-2020-0128523 | 11/2020 |
| KR | 10-2020-0135946 | 12/2020 |
| KR | 10-2020-0136894 | 12/2020 |
| WO | WO 2010/030313 | 3/2010 |
| WO | WO 2014/109435 | 7/2014 |
| WO | WO 2016/048204 | 3/2016 |
| WO | WO 2016/201333 | 12/2016 |
| WO | WO 2017/004433 | 1/2017 |
| WO | WO 2018/004812 | 1/2018 |
| WO | WO 2018/160274 | 9/2018 |
| WO | WO 2018/165191 | 9/2018 |
| WO | WO 2019/168614 | 9/2019 |
| WO | WO 2019/168615 | 9/2019 |
| WO | WO 2019/168619 | 9/2019 |
| WO | WO 2019/168620 | 9/2019 |
| WO | WO 2019/168630 | 9/2019 |
| WO | WO 2019/168631 | 9/2019 |
| WO | WO 2019/168636 | 9/2019 |
| WO | WO 2019/168637 | 9/2019 |
| WO | WO 2019/168638 | 9/2019 |
| WO | WO 2019/168646 | 9/2019 |

OTHER PUBLICATIONS

PCT Application No. PCT/US2018/013378 International Preliminary Report On Patentability dated Sep. 3, 2019.
PCT Application No. PCT/US2018/013378 International Search Report and Written Opinion dated Mar. 8, 2018.
PCT Application No. PCT/US2018/021197 International Preliminary Report on Patentability dated Sep. 10, 2020.
PCT Application No. PCT/US2018/021197 International Search Report and Written Opinion dated May 30, 2018.
PCT Application No. PCT/US2019/015120 International Preliminary Report on Patentability dated Sep. 1, 2020.
PCT Application No. PCT/US2019/015120 International Search Report and Written Opinion dated Apr. 15, 2019.
PCT Application No. PCT/US2019/015273 International Preliminary Report on Patentability dated Sep. 1, 2020.
PCT Application No. PCT/US2019/015273 International Search Report and Written Opinion dated Apr. 23, 2019.
PCT Application No. PCT/US2019/015124 International Preliminary Report on Patentability dated Sep. 1, 2020.
PCT Application No. PCT/US2019/015124 International Search Report and Written Opinion dated Apr. 15, 2019.
PCT Application No. PCT/US2019/015275 International Preliminary Report on Patentability dated Sep. 1, 2020.
PCT Application No. PCT/US2019/015275 International Search Report and Written Opinion dated Apr. 23, 2019.
PCT Application No. PCT/US2019/016167 International Preliminary Report on Patentability dated Sep. 1, 2020.
PCT Application No. PCT/US2019/016167 International Search Report and Written Opinion dated Aug. 26, 2019.
PCT Application No. PCT/US2019/016180 International Preliminary Report on Patentability dated Sep. 1, 2020.
PCT Application No. PCT/US2019/016180 International Search Report and Written Opinion dated Apr. 23, 2019.
PCT Application No. PCT/US2019/016686 International Preliminary Report on Patentability dated Sep. 1, 2020.
PCT Application No. PCT/US2019/016686 International Search Report and Written Opinion dated Apr. 10, 2019.
PCT Application No. PCT/US2019/016698 International Preliminary Report on Patentability dated Sep. 1, 2020.
PCT Application No. PCT/US2019/016698 International Search Report and Written Opinion dated Apr. 11, 2019.
PCT Application No. PCT/US2019/016694 International Preliminary Report on Patentability dated Sep. 1, 2020.
PCT Application No. PCT/US2019/016694 International Search Report and Written Opinion dated Apr. 15, 2019.
PCT Application No. PCT/US2019/017100 International Preliminary Report on Patentability dated Sep. 1, 2020.
PCT Application No. PCT/US2019/017100 International Search Report and Written Opinion dated Apr. 17, 2019.
U.S. Appl. No. 15/448,356 Final Office Action dated Oct. 21, 2020.
U.S. Appl. No. 15/448,356 Office Action dated May 28, 2020.
U.S. Appl. No. 15/448,356 Final Office Action dated Aug. 6, 2019.
U.S. Appl. No. 15/448,356 Office Action dated Jan. 8, 2019.
U.S. Appl. No. 15/448,356 Final Office Action dated Aug. 31, 2018.
U.S. Appl. No. 15/448,356 Office Action dated Mar. 5, 2018.
U.S. Appl. No. 15/450,602 Final Office Action dated Nov. 2, 2018.
U.S. Appl. No. 15/450,602 Office Action dated Apr. 6, 2018.
U.S. Appl. No. 16/681,477 Office Action dated Apr. 16, 2020.

(56) References Cited

OTHER PUBLICATIONS

U.S. Appl. No. 15/908,569 Office Action dated Mar. 27, 2020.
U.S. Appl. No. 15/908,569 Office Action dated Jun. 28, 2019.
U.S. Appl. No. 15/908,722 Office Action dated Oct. 30, 2020.
U.S. Appl. No. 15/908,722 Final Office Action dated Jun. 12, 2020.
U.S. Appl. No. 15/908,722 Office Action dated Jun. 28, 2019.
U.S. Appl. No. 15/908,635 Office Action dated Jun. 28, 2019.
U.S. Appl. No. 15/908,531 Office Action dated Jun. 28, 2019.
U.S. Appl. No. 15/908,657 Office Action dated Jun. 28, 2019.
U.S. Appl. No. 15/908,438 Office Action dated Oct. 3, 2019.
U.S. Appl. No. 15/908,345 Office Action dated Jan. 10, 2020.
U.S. Appl. No. 15/908,704 Final Office Action dated Jun. 12, 2020.
U.S. Appl. No. 15/908,704 Office Action dated Jun. 28, 2019.
U.S. Appl. No. 15/908,712 Office Action dated Aug. 8, 2019.
U.S. Appl. No. 15/908,707 Final Office Action dated Nov. 18, 2019.
U.S. Appl. No. 15/908,707 Office Action dated Jul. 17, 2019.
U.S. Appl. No. 17/207,679, Christopher Thielbar, Online Tournament Integration, filed Mar. 21, 2021.
U.S. Appl. No. 17/188,544, Steven Trombetta, Scaled VR Engagement and Views in an E-Sports Event, filed Mar. 21, 2021.
EP Application No. 19761465.4 Extended European Search Report dated Sep. 1, 2021.
EP Application No. 19761341.7 Extended European Search Report dated Aug. 17, 2021.
EP Application No. 19761523.0 Extended European Search Report dated Aug. 12, 2021.
IN Application No. 202027037125 First Examination Report dated Aug. 5, 2021.
EP Application No. 19760493.7 Extended European Search Report dated Sep. 2, 2021.
U.S. Appl. No. 15/448,356 Final Office Action dated Jul. 28, 2021.
U.S. Appl. No. 17/080,551, Steven Trombetta, Statistically Defined Game Channels, filed Oct. 26, 2020.
U.S. Appl. No. 17/014,149, Steven Trombetta, Integrating Commentary Content and Gameplay Content Over a Multi-User Platform, filed Sep. 8, 2020.
U.S. Appl. No. 17/014,182, Steven Trombetta, De-Interleaving Gameplay Data, filed Sep. 8, 2020.
U.S. Appl. No. 17/000,841, Steven Trombetta, Incentivizing Players to Engage in Competitive Gameplay, filed Aug. 24, 2020.
U.S. Appl. No. 17/015,845, Steven Trombetta, Player to Spectator and Other Spectator Controls, filed Sep. 9 2020.
U.S. Appl. No. 17/060,458, Steven Trombetta, Discovery and Detection of Events in Interactive Content, filed Oct. 1, 2020.
U.S. Appl. No. 15/448,356 Office Action dated Apr. 12, 2021.
U.S. Appl. No. 16/681,477 Office Action dated Mar. 19, 2021.
EP Application No. 18763374.8, Extended European Search Report dated Dec. 14, 2020.
U.S. Appl. No. 16/681,477 Final Office Action dated Nov. 30, 2020.
U.S. Appl. No. 17/380,373, Steven Trombetta, Statistical Driven Tournaments, filed Jul. 20, 2021.
Dietrich et al., Carlos; "Baseball4D: A tool for baseball game reconstruction & visualization", 2014 IEEE Conference on Visual Analytics Science and Technology (VAST), IEEE, Oct. 25, 2014, pp. 23-32.
EP Application No. 19760732.8 Extended European Search Report dated Oct. 1, 2021.
KR Application No. 10-2019-7029332 Office Action dated Oct. 19, 2021.
EP Application No. 19760888.8 Extended European Search Report dated Oct. 27, 2021.
EP Application No. 19760016.6 Extended European Search Report dated Oct. 8, 2021.
EP Application No. 19759929.3 Extended European Search Report dated Oct. 25, 2021.
EP Application No. 19760240.2 Extended European Search Report dated Feb. 2, 2022.
EP Application No. 19760240.2 Partial Supplementary European Search Report dated Oct. 13, 2021.
EP Application No. 19760890.4 Extended European Search Report dated Nov. 10, 2021.
IN Application No. 202027037244 First Examination Report dated Dec. 15, 2021.
U.S. Appl. No. 17/014,149 Office Action dated Sep. 29, 2021.
U.S. Appl. No. 17/014,182 Office Action dated Sep. 29, 2021.
U.S. Appl. No. 17/000,841 Office Action dated Sep. 20, 2021.
U.S. Appl. No. 17/015,845 Office Action dated Oct. 6, 2021.
U.S. Appl. No. 17/060,458 Office Action dated Oct. 6, 2021.
U.S. Appl. No. 17/080,551 Office Action dated May 12, 2022.
U.S. Appl. No. 17/188,544 Office Action dated Jun. 27, 2022.
PCT Application No. PCT/US22224943 International Search Report and Written Opinion dated Jul. 28, 2022.
U.S. Appl. No. 17/207,679 Office Action dated Jul. 22, 2022.
U.S. Appl. No. 17/380,373 Office Action dated Aug. 5, 2022.
U.S. Appl. No. 17/362,416 Office Action dated Sep. 6, 2022.
Racing game video curation application "Motor Tube" starts delivering its service, 4Gamer.net [online], Nov. 17, 2016 [retrieved on: Nov. 25, 2022].
Support is announced for battle game video curation application "Kak-gei Tube", MSY [onlin], Jul. 14, 2016 [retrieved on: Nov. 25, 2022].
JP Application No. 2020-545251 Non-Final Notification of Reasons for Refusal dated Oct. 11, 2022.
JP Application No. 2020-545273 Non-Final Notification of Reasons for Refusal dated Oct. 18, 2022.
JP Application No. 2020-55313 Non-Final Notification of Reasons for Refusal dated Dec. 6, 2022.
JP Application No. 2020-545317 Non-Final Notification of Reasons for Refusal dated Nov. 15, 2022.
JP Application No. 2020-545263 Non-Final Notification of Reasons for Refusal dated Dec. 6, 2022.
JP Application No. 2020-545320 Notification of Reasons for Refusal dated Nov. 15, 2022.
JP Application No. 2020-545275 Non-Final Notification of Reasons for Refusal dated Oct. 18, 2022.
JP Application No. 2020-545245 Non-Final Notification of Reason(s) for Refusal dated Oct. 4, 2022.

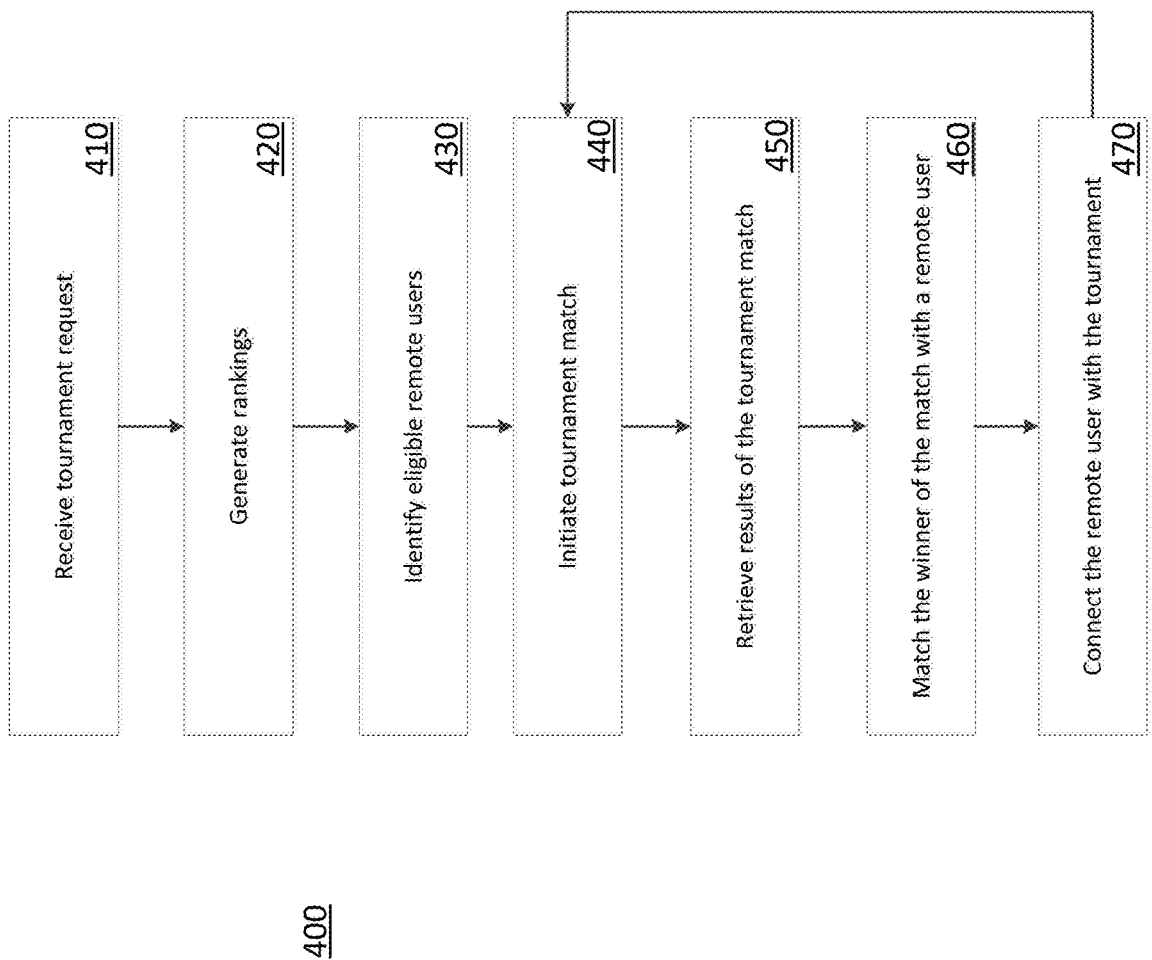

US 11,600,144 B2

CREATION OF WINNER TOURNAMENTS WITH FANDOM INFLUENCE

CROSS-REFERENCE TO RELATED APPLICATION

The present application is a continuation and claims the priority benefit of U.S. patent application Ser. No. 15/908,707 filed Feb. 28, 2018, now U.S. Pat. No. 10,818,142, which is incorporated herein by reference in its entirety.

BACKGROUND

Field of Invention

The present invention generally relates to electronic sports (e-sports). More specifically, the present invention relates to creation of winner tournaments with fandom influence.

Description of the Related Art

There are presently a wide variety of online games played in a variety of different modes. Some games are played head-to-head against one or more player, while others are played in teams, which may or may not be against another team. The ability to compete against other players and/or teams lends itself to tournament-style play. Similar to real-world tournaments, such a tournament for online games may involve setting up, identifying qualified players, ranking or seeding players, bracketing or matching each round, scheduling competitions, resolving disputes, distributing the tournament competitions to viewers, results verification, and timely communication of tournament data.

Many game titles do not provide native support for tournament-style play, however. As such, current online tournaments may be run by end-users or third parties whose systems are not integrated into the game and which therefore lack visibility and insight into in-game and tournament activities. Such online tournaments may therefore experience significant barriers to entry, as well as face problems in implementation. Such problems may lessen enjoyment and other benefits not only for the players, but also for spectators, commentators and other streamers, developers, sponsors, etc. As a result, tournaments may tend to be run by third parties for popular titles with numerous expert players. Such tournaments may exclude or at least be discouraging to novice players, as well as fail to offer less popular game titles.

One problem in the early stages of holding a tournament may involve skills evaluation. Tournaments are more competitive and therefore successful, for example, when disparities in skill level are not too great. Expert players may find it boring to play inexperienced players, while the inexperienced players may find it demoralizing to play expert players. Further, such games as played between players of wide disparate skill level are often short and have predictable outcomes, leading spectators to be bored as well.

Competitive gaming, commonly referred to as electronic sports or "eSports," involves the competitive play of video games in a tournament setting. Competitive leagues and a constant stream of tournaments evolved to provide structure for the eSports community. Players now have the option of competing in a vast array of professional and amateur competitions held at physical locations or in virtual competitions conducted online. Leagues and content providers such as Major League Gaming (MLG), and Global StarCraft® League, provide opportunities for competition and to find information about competitive gaming. Until recently, participation in competitive gaming has demonstrated a gradual and steady pace in growth. However, competitive gaming is presently undergoing a rapid expansion in participation and interest.

Currently there is a limitation regarding who competitors can be paired against during the course of an e-sport event. Although video games (specifically multi-player games) may use statistical based match-making (e.g. ELO) that can be used to match players against other players with relatively similar skill levels, typical e-sport events utilize a bracket system to identify opponents among other existing competitors at the live e-sport event. Thus there is an area of improvement for match making for live e-sport events to incorporate possible "challengers" who may not be attending the live e-sport event.

SUMMARY OF THE CLAIMED INVENTION

Embodiments of the present invention include a method
Embodiments of the present invention also include a system
Embodiments of the present invention include a non-transitory computer-readable storage medium having embodied thereon a program, the program being executable by a processor to perform a method

BRIEF DESCRIPTION OF THE DRAWINGS

FIG. 4 is a method for creating winner tournaments with fandom influence.

DETAILED DESCRIPTION

The present disclosure describes methods and systems directed towards creation of winner tournaments. Instead of using traditional tournament bracket structures which establish pre-set match-ups between participating players in a tournament at an e-sport event, the present disclosure broadens the scope of participants who may be eligible to also participate within the same tournament but who may not initially be attending the e-sport event. With the e-sport competitive scene, not only do professionals compete against each other during a live e-sport event but remote users remotely viewing the e-sport event can also be introduced into the tournament structure as well. These remote users can be introduced into the live e-sport event for the purpose of also competing against competitive players as well as being introduced as an exhibition match with the professionals (e.g. fans of the professionals selected based on social media). Therefore, the systems and methods would select and facilitate eligible remote users to compete with the professionals even if the remote user is not at the live e-sport event venue.

Although the embodiments describe remote users as those users not at the e-sport event venue who are remotely viewing the live e-sport event on their computing device at a different location, it is also possible to extend features of the present disclosure to cover spectators at the live e-sport event venue who are not participating in the live e-sport event. Spectators who are seated in the live e-sport event venue may be considered and selected to participate in the live e-sport event in a similar manner as remote users. Thus the present disclosure can encompass not only remote users but also spectators at the live e-sport event.

As referred to herein, an e-sports event is a competition involving a number of different video game competitors. The video game used for the competition can vary from a wide variety of genres and titles. People can attend and view live e-sport events much like other typical sports (e.g. football, basketball) in designated arenas or stadiums. People can also view these live e-sports events remotely via distributions such as broadcast streams viewable on their respective computing devices 120 via an e-sport event stream.

Figure 1:
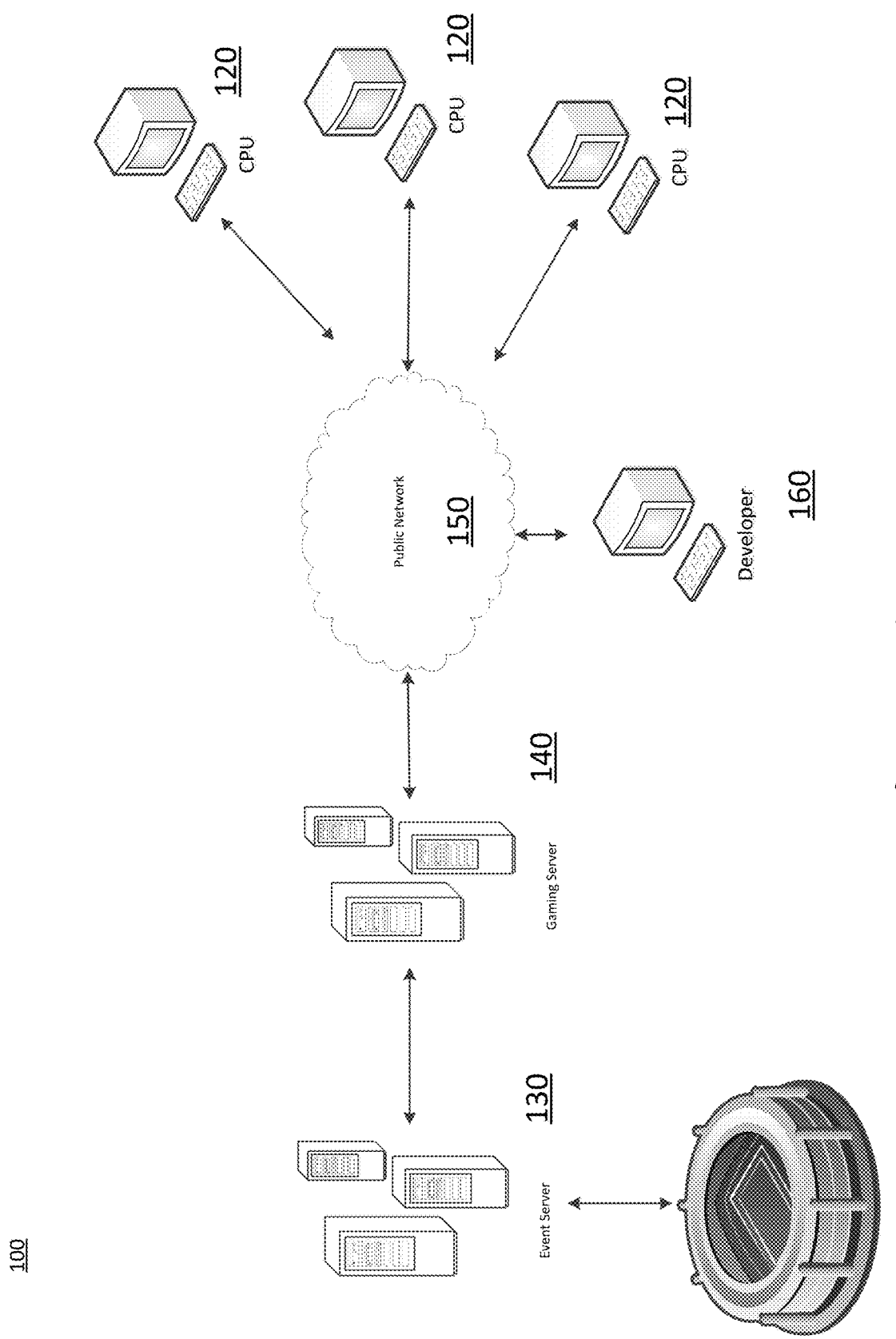
FIG. 1 is a system for creating winner tournaments with fandom influence.

FIG. 1 is a system 100 for creating winner tournaments with fandom influence. As an overview, the system 100 is used to run and manage tournaments associated with a live e-sport event 110. Competitors may initially participate in the live e-sport event 110 at the venue while various remote users view the ongoing e-sport event on their respective computing devices 120. However, as the e-sport event progresses, the remote users on their computing devices 120 may have an opportunity to also participate in the live e-sport event 110.

The e-sport event data from the live e-sport event 110 is collected and processed at event server 130. The e-sport event data from the live e-sport event 110 is then transmitted to the gaming server 140 which not only provides the distribution of the e-sport event data to the remote viewers on their computing devices 120 but also facilitates the remote viewer participation with the live e-sport event 110.

Remote users viewing the live e-sport event 110 and when chosen to participate in the live e-sport event 110 do so with their respective computing devices 120. Exemplary computing devices 120 may include laptops, desktops, mobile devices, and tablets. Remote viewing and participation in the live e-sport event 110 may require specialized applications and software (e.g. video game) which can be directly downloaded from the gaming server 140 or other sources onto their computing devices 120. In other situations, web-based applications or streaming services may provide user access to, viewing of, and participation in the live e-sports event.

In a further embodiment, remote users may be able to view and participate in live e-sports event using their computing devices 120 that have virtual reality (VR) or augmented reality (AR) features. VR and AR implementation could provide remote users a first person perspective within the video game for the purposes of viewing what is happening during the live e-sport event or even playing the game with this perspective. VR and AR may also allow for user modifications of the display of the e-sport event such as modifying user viewpoint with respect to the video game or adding additional data (e.g. statistics, highlights) to highlight aspects occurring within the video game. Further details regarding the features of the system 100 and how each of the features are used to carry out the creation of the winner tournaments with fandom influence will be provided below.

Generally, the event server 130 initiates, runs, and manages the live e-sport event 110. In doing so, the event server 130 would be used to obtain e-sport data from the live e-sport event 110 for the purpose of distributing that information to remote viewers to view on their computing device 120 via the gaming server 140. The live e-sport event 110 can be a video game competition held at a predetermined location such as an arena or stadium dedicated to e-sports. The live e-sport event data obtained from the live e-sport event 110 would include gameplay information associated with each of the video game competitors participating within the live e-sport event 110.

As an example, if the live e-sport event 110 is a first-person shooter game between ten different players (e.g. 5 versus 5 match), the live e-sport event data would be the gameplay data associated with each of those ten players during the match. The gameplay data being obtained from the live e-sport event 110 may include video gameplay information associated with each player's individual interactions with respect to the videogame such as each of their point of view and game state within the video game at any given moment in time. The gameplay data may also include different player's inputs (e.g. keyboard and mouse inputs) and communications (e.g. voice and text chat) between teammates that each competitor provides during the course of the match as well.

The event server 130, in the process of obtaining gameplay data for each player, can also obtain video recordings of each player during the course of the match. The video recordings may be recordings of each player's screen as the video game match is occurring. The video recording may also be an in-game perspective of the video game match using features (e.g. spectator camera perspectives) associated with the video game. This video data can be provided to the gaming server 140 to be used in the e-sport event distribution (or used to supplement rendered gameplay video from the gaming server 140) sent to the users on their computing devices 120.

The event server 130 may also be capable of obtaining information related to video game being played during the e-sport event 110. For example, microphones, cameras, and/or sensors may be used to capture information about the audience attending the live e-sport event 110. Furthermore, any audio and video related to on-site commentators can also be captured by the event server 130.

The event server 130 can store the information obtained from the live e-sport event data in a database. The database may be used to store the video data as well as any gameplay information retrieved from the event server 130. The information stored within the database can be accessed by the gaming server 140 as needed, for example, to generate statistics related to past performance of particular players for use in any e-sport event stream.

The event server 130 is also used to facilitate remote user participation on their computing device 120 with the live e-sport event. When one or more remote users are chosen to participate, the gaming server 140 may facilitate a different connection of the chosen user computing devices with the event server 130. The event server 130 receives the user inputs from the computing device 120 (e.g. controller inputs, gestures) in real-time and uses those inputs to carry out the remote user participation within the video game of the live e-sport event.

Since typical e-sports events have all players within the same venue and therefore using the same network, latency differences may not be an issue. However, with the use of remote users as being potential participants in the live e-sport event, there would be a need to provide dedicated channels of communication so that the latency associated with these remote user inputs can be minimized. Absent dedicated channels, remote user inputs may be significantly delayed compared to inputs received by competitors at the e-sport event venue. The delays could introduce unfair advantages for onsite competitors with having their inputs potentially entered first. In other situations if video games wait for all inputs to be received (taking into account possible delays from remote users), the game state may become choppy/non-fluid (e.g. visible pauses) that detract from the performance of the video game.

To address this issue, the event server 130 and the gaming server 140 is configured to utilize at least two different channels of communication where one dedicated distribution channel may be associated with distribution of the event data for viewing by remote users on their computing devices 120 while a different dedicated player channel may be associated for transmitting and receiving game data from the participating remote user.

The dedicated distribution channel would be usable by more remote viewers in viewing the distributed event data from the gaming server 140. This dedicated distribution channel may have higher latency than the dedicated player channel as more users would be associated with the dedicated distribution channel. To compensate for the increased latency, event data broadcasts may not be "live" but instead incorporate a pre-determined amount of delay on the remote viewer end at the computing devices 120.

With respect to the chosen remote user participating in the live e-sport event 110, a higher quality dedicated player channel would be used that has reduced latency. This would allow the chosen remote user to receive gameplay information from the event server 130 and provide user input from the computing device 120 with minimal delay.

The gaming server 140, using the information obtained from the event server 130, detects when new competitors may be needed for the live e-sport event. For example, the event server 130 may provide notification that all previous matches have been completed and that additional competitors may be needed for the next round of matches to the gaming server 140. When the gaming server 140 receives this notification, the gaming server 140 may begin querying for eligible competitors from the various remote viewers.

The gaming server 140 may have stored information about each remote user associated with the computing devices 120 currently viewing the live e-sport event stream. Each user may be required to sign in to a particular user account and verify the identity of the user before being able to access and view the live e-sport event stream. The user profiles would also include related gameplay statistics of the users.

The gameplay statistics of each user would be obtainable from the computing devices 120. For example, gameplay statistics may include total time the user has spent playing the game, progress or completion of the game, and in-game character information. The gameplay statistics would be used to characterize a player skill related to video games the user has played. The player skill is a factor that identifies whether the user would be eligible to remotely participate in the live e-sport event. For e-sport events, competitors with relatively similar skill level may be chosen in order to provide competitive matches. Choosing a skill level that is too far apart may provide non-engaging matches where one player is more skilled and dominant over the other player.

Even if player skill is far apart (perhaps because of the available pool of remote players), the player skill could identify the handicaps that would be need to be implemented within the live e-sport event so that the remote player is on a relatively even playing level as the opposing competitor. For example, additional health or increased damage can be introduced for the less skilled player (or vice versa reducing the health or decreasing damage for the more skilled player) in order to provide a more level playing field.

How a particular remote user on their computing device 120 is chosen to participate within the live e-sport event can depend on a variety of different factors which can be set at the gaming server 140. Developers 160 or any other party associated with setting up and managing the live e-sport event 110 may be able to specify the remote users who would be eligible to compete.

For example, remote users on their computing devices 120 may need to have certain characteristics to place these users into a pool of eligible competitors who may be chosen at random by the gaming server 140. Exemplary characteristics may include related gameplay data that characterizes the user's skill level above a pre-set threshold and that the user has the associated video game installed and running on the computing device. In this way, the gameplay server 140 can ensure that the remote user has the game, has experience with the game, and is capable of using the video game to participate in the e-sport event if chosen.

Remote users may also need to subscribe or purchase the ability to be considered by the gaming server 140. Remote users may be able to view live e-sport events for free or with a low price of admission on their computing device 120. However, to be considered for possible participation within the live e-sport event, remote users may need to purchase a different ticket that allows them to be placed in the pool of eligible competitors. There may be different tickets that provide different levels of opportunity for being considered by the gaming server 140.

In some embodiments, the gaming server 140 may also utilize social media to match remote users with competitors within the live e-sport event 110. The gaming server 140 can query various social media sites in the public network 150 for possible remote users to choose when challengers are needed. Users may need to link their social media accounts with their user profile so that the gaming server 140 would know where to search.

Example queries performed by the gaming server 140 may search for keywords or phrases. These queries may also be performed beforehand and stored in the user profiles until needed. For example, if player A and B are known to participate in the live e-sport event, remote users who are fans of player A and B (and thus have posted positive reactions regarding those players) can be identified from queries involving their social media and that characterization can be stored prior to the start of the live e-sport event and used as needed. Possible embodiments may also include identifying negative reactions as well from remote users and setting up matchups between player A with users who negatively post about those players (e.g. the remote users who negatively post because they believe they are better).

During the course of the live e-sport event 110, exhibition (or non-competitive) matches may be scheduled that match remote users who are fans of one or more competitors participating in the live e-sport event 110. Skill level can be used to find the fan that has a similar skill level as the competitor (e.g. the competitor may only want to face fans that have a pre-determined skill threshold). In other cases, skill level can establish handicap levels to level the playing field. Although used with reference to exhibition matches, social media can also be used to also identify competitors for live e-sport events.

When the gaming server 140 identifies the computing device 120 that is chosen as the next participant in the live e-sport event 110, the gaming server 140 may perform the switch off between the distribution channel and the player channel for a particular computing device instantaneously without the user at the chosen computing device further input or knowledge. In some instances, a notification may be provided to the chosen remote user of the computing device 120 that changes may be implemented in the case some interruptions are expected switching from a delayed distribution of the e-sport event data to a more live distribution of the e-sport event data. Further notification may be used to set up the necessary interfaces for the remote user to participate in the e-sport event (e.g. booting up the video game on the computing device 120 so that the user is able to participate).

As described above, the gaming server 140 generates the e-sport event stream that will be distributed to the remote users on their computing devices 120. These e-sport event stream distributions may generally include a video recording of the live e-sports event 110 along with additional information and commentary aimed at immersing the user when viewing the live e-sports event. The video recording may be obtained directly from the e-sports event 110 via the event server 130. It may also be possible for the gaming server 140 to re-render game states of the video game using only the extract gameplay data from the event server 130. For this situation, the gaming server 140 may have stored related video game assets associated with the video game associated with the live e-sports event 110. By using the extracted gameplay data and the stored video game assets, the gaming server 140 may be able to re-create video of the video game as if the gameplay video from the live e-sport event was recorded directly via the gaming server 140.

The gaming server 140, using the live e-sport event data coming from the event server 130, can then extract relevant information the e-sport data streams that viewers will view on their computing devices 120. The types of extracted information obtained by the gaming server 140 can be the information that viewers may find interesting.

Although video games may be capable of providing some of the information that the gaming server 140 may be capable of extract and processing for viewer consumption, the gaming server 140 may also be capable of providing additional information that video games do not typically track/monitor. For example, the gaming server 140 may be able to extract each individual statistics associated with a particular match by analyzing the game-state and each player input during the course of the match. Information (as applied to a first person shooter such as kills, deaths, and accuracy) may generally be available information from the video game. However, the gaming server 140 would be able to provide further additional detailed information from the processing of the gameplay data.

The additional detailed information would be obtainable by the gaming server 140 through the use of customizable instructions that instruct the gaming server 140 to aggregate relevant gameplay information and process the information to obtain the desired statistic. For the exemplary reaction time for shots, the gaming server 140 may be programmed to aggregate the gameplay data and track situations when a target is spotted by a player within an aiming reticle and timing when a shot is fired once the target is spotted. With respect to near misses, game-state information can be aggregated and processed to identify for all shots that miss the target and where the shot was in relation to the missed target.

With the information that the gaming server 140 is able to obtain from the e-sport event data, metadata is generated so that such information can be associated with a video distribution to the users on their computing device 120. The video distribution of the e-sport event (described below) would use the metadata to associate what information should be associated with a particular time frame of the video. For example, at a particular part of a stream, information about a player's current performance can be added as a bubble nearby that player's avatar within the game. The metadata would be used as an indicator regarding what information would go there. For example, metadata may be used to link a player kill/death ratio whenever that player kills another player or is killed by another player. Metadata can similarly be used to link relevant game state information to be displayed on the e-sport event data stream such as the player's current equipment, health, level, and rank whenever that player appears on the stream.

Each metadata generated by the gaming server 140 may be assigned a unique identification that is linked with e-sport event data used in a stream. Because the metadata is uniquely identified to be associated with event data and is used to indicate where and when the additional information is incorporated into the event data stream, it is not necessary for the gaming server 140 to store the entire event data used in the stream and the additional information obtained from the live e-sports event 110. This allows storage of the e-sport event data and the metadata separately. Furthermore, whenever e-sport event data is used in a stream, the corresponding metadata associated with the e-sport event data can be retrieved from the event metadata database 190 via the gaming server 140 querying the event metadata database 190 for any relevant metadata.

Furthermore, the gaming server 140 could aggregate information from each of the player's gameplay data in order to compile a map that is a composite summary of the video game at any point in time. For example, first person shooters may not typically generate a comprehensive map that includes all the positions of each player on both teams. Generally, in-game maps would include information from one team's perspective. The other team may be obscured (for example by "a fog of war" type effect). However, the gaming server 140 would be able to provide a full unobstructed view of the map using game-state information from both teams so that viewers may have a complete understanding of what is happening within the video game at any moment. This feature would not prevent the ability of the system 100 to restrict user vision of the event as needed (e.g. to provide a particular player's or team's perspective).

The gaming server 140 can also provide different viewpoints of the event. The event server 130 collects all types of information from the live e-sport event that includes the viewpoints from different players. Furthermore, videogames may have the ability to provide different viewpoints of the environment within the game and the gaming server 140 using this feature can similarly change the viewpoint that users can view on their respective computing devices 120.

In a further embodiment, the gaming server 140 is capable of using the collected information from the live e-sport event from the different players in order to reconstruct a different viewpoint if such viewpoint is not available within the video game. This may be done by using the collected information from the event server 130 and the stored game assets available to the gaming server 140. The gaming server 140 may be able to re-render what the state of the video game at a given point in time and then focus re-rendering certain portions based on the desired focus. This allows the gaming server 140 to provide a different (and possibly comprehensive) view of the video game using all the information available in situations where only partial information may be known by each individual participant (e.g. eliminating "fog of war" effects).

The gaming server 140 is also capable of incorporating advertisements within the e-sport event distribution to facilitate monetization. Advertisements may be stored in a dedicated advertisement database. When needed, the gaming server 140 can query the advertisement database for the appropriate advertisement(s) to be implemented into the live e-sport event distribution. What advertisement is chosen can be based on a number of different factors. For example, user profiles may be used to select types of ads a particular user may be interested in viewing. Certain developers or tournament organizers may also indicate a set of advertisements that should be incorporated into live e-sport event distribution. The advertisements themselves may include information that suggests the types of users and/or streams that they may be incorporated with. For example, certain advertisements may be incorporated if a particular genre or a particular video game is distributed. The incorporation of the advertisements allows for the monetization of the live e-sport events to many possible remote viewers on their computing devices 120.

Commentary can also be added to the e-sport event distribution using information obtained from the event server 130 (for example from commentators at the live e-sport event 110). In other situation, one or more users on their computing devices 120 may be capable of assuming a commentating role. The users that assume a commentating role may need to be verified and authenticated beforehand (so as to control who is able to commentate and distribute their commentary to remote viewers), but would allow a variety of different commentators to commentate the same live e-sport event 110.

If authenticated and verified, these users may be provided a unique user interface that interacts with the gaming server 140 in order to modify the e-sport event distribution to correspond to their commentary. For example, the commentators may be able to control viewpoints of the game data of the e-sport event being distributed as well as the additional information that is displayed as well. Such features would facilitate the effectiveness of the commentary allowing the commentators to focus on events within the event data being distributed and provide corresponding details related to what is being discussed. Furthermore, there may also be a separate dedicated commentary distribution channel to allow for the e-sport event data to be provided near real-time to the commentator and so that the commentator can implement commentary that is later distributed to the remote users. Since each user may have a preferred commentator, the ability to allow third parties and users to introduce their own commentary into the system 100 would also be beneficial for views of the e-sport event.

The public network 150 facilitates communication of the e-sports event data from the gaming server 140 with the plurality of user computing devices 120. The public network 150 can also include one or more private networks, such as, a local area network (LAN), a wide area network (WAN), or a network of public/private networks, such as the Internet. The Internet is a broad network of interconnected computers and servers allowing for the transmission and exchange of Internet Protocol (IP) data between user devices connected through a network service provider. Examples of network service providers include the public switched telephone network, a cable service provider, a provider of digital subscriber line (DSL) services, or a satellite service provider.

Developers 160 are also able to affect how the distribution of the live e-sport event data is performed. Developers 160 are able to interact with the event server 130 and gaming server 140 using their respective computing devices. For example, developers 160 may create, run, and manage the live e-sport event. Furthermore, modifications to how the distribution of the event data to the remote viewers on their computing devices 120 can also be implemented by the developers 160 such as identifying what advertisements should be incorporated and what additional information (e.g. statistics) should be shown during the distribution of the e-sport event data.

Figure 2:
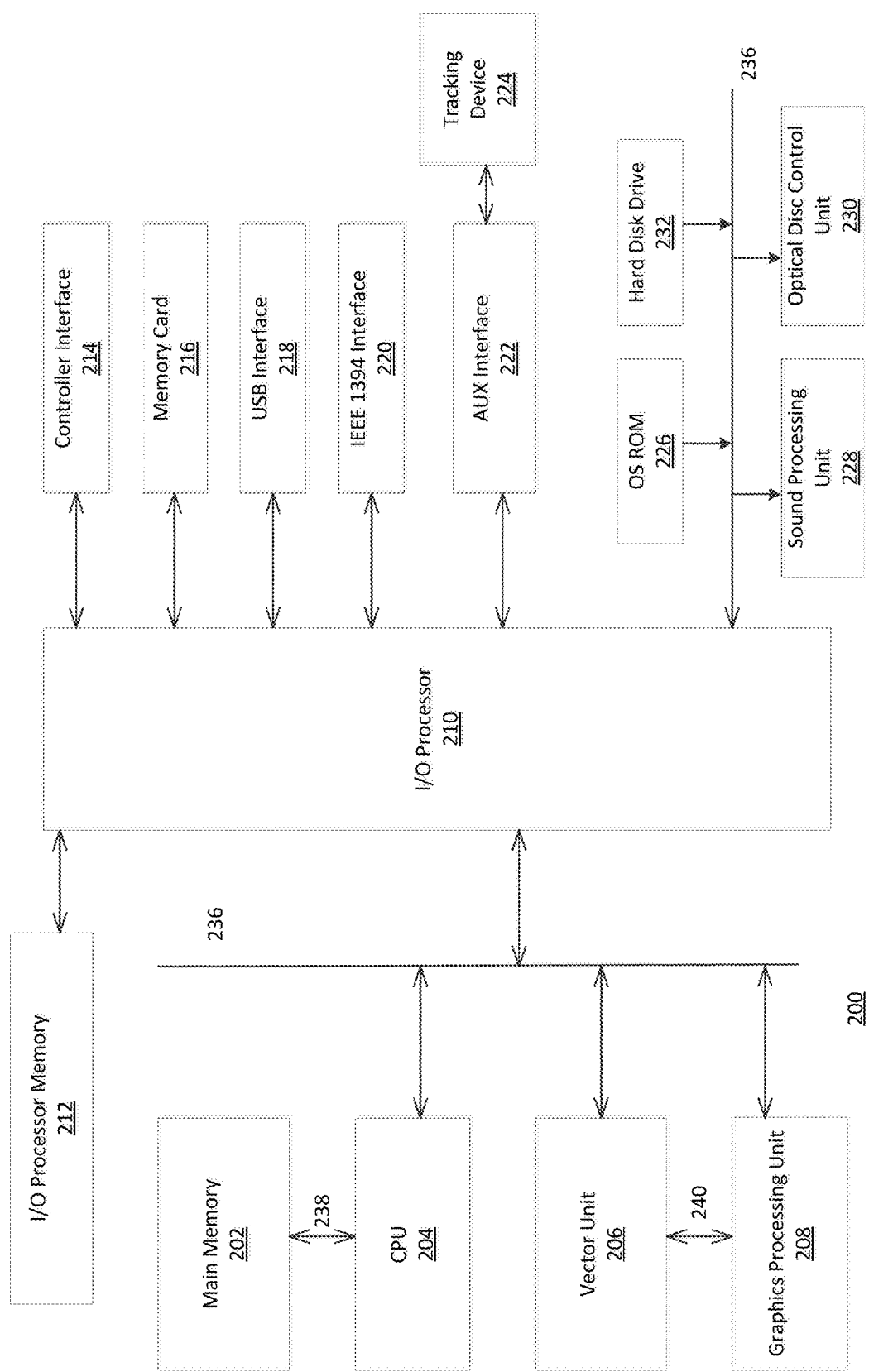
FIG. 2 is a user device used in context of the system of FIG. 1.

FIG. 2 is a user computing device 200 used in context of the system of FIG. 1. The user computing device 200 (e.g., desktop, laptop, tablet, mobile device, console gaming system) is a device that the user can utilize to facilitate carrying out features of the present invention pertaining to creating winner tournaments with fandom influence. The user computing device 200 would also facilitate the user viewing of the distributed e-sport event data via a display associated with the user computing device 200.

The user computing device 200 may include various elements as illustrated in FIG. 2. It should be noted that the elements are exemplary and that other embodiments may incorporate more or less than the elements illustrated. With reference to FIG. 2, the user computing device 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE 1394 interface 220, an auxiliary (AUX) interface 222 for connecting a tracking device 224, although other bus standards and interfaces may be utilized. The user device 200 further includes an operating system read-only memory (OS ROM) 226, a sound processing unit 228, an optical disc control unit 230, and a hard disc drive 232, which are connected via a bus 234 to the I/O processor 210. The user computing device 200 further includes at least one tracking device 224.

The tracking device 224 may be a camera, which includes eye-tracking capabilities. The camera may be integrated into or attached as a peripheral device to user device 200. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to user computing device 200 that captures voice data. The microphone may conduct acoustic source localization and/or ambient noise suppression. The microphones may be usable to receive verbal instructions from the user to schedule, retrieve and display content on the user computing device 200.

Alternatively, tracking device 224 may be the controller of the user computing device 200. The controller may use a combination of built-in accelerometers and infrared detection to sense its position in 3D space when pointed at the LEDs in a sensor nearby, attached to, or integrated into the console of the entertainment system. This design allows users to control functionalities of the user computing device 200 with physical gestures as well as button-presses. The controller connects to the user device 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user computing device 200 may be an electronic gaming console. Alternatively, the user computing device 200 may be implemented as a general-purpose computer, a set-top box, or a hand-held gaming device. Further, similar user devices may contain more or less operating components.

The CPU 204, the vector unit 206, the graphics processing unit 208, and the I/O processor 210 communicate via a system bus 236. Further, the CPU 204 communicates with the main memory 202 via a dedicated bus 238, while the vector unit 206 and the graphics processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 232. The I/O processor 210 primarily controls data exchanges between the various devices of the user computing device 200 including the CPU 204, the vector unit 206, the graphics processing unit 208, and the controller interface 214.

The graphics processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics processing unit 208. Furthermore, the sound processing unit 230 executes instructions to produce sound signals that are outputted to an audio device such as speakers (not shown).

A user of the user computing device 200 provides instructions via the controller interface 214 to the CPU 204. For example, the user may instruct the CPU 204 to store certain information on the memory card 216 or instruct the user computing device 200 to perform some specified action. Example controllers associated with the controller interface 214 may include a touch-screen, keyboards and game controllers.

Other devices may be connected to the user computing device 200 via the USB interface 218, the IEEE 1394 interface 220, and the AUX interface 222. Specifically, a tracking device 224, including a camera or a sensor may be connected to the user computing device 200 via the AUX interface 222, while a controller may be connected via the USB interface 218. In some embodiments, a VR headset or related hardware equipment may be communicatively coupled to computing device 200 via one or more computing interfaces. Hardware and related software for implementing an augmented reality (AR) experience may similarly be coupled to computing device 200 via on or more computing interfaces.

Figure 3:
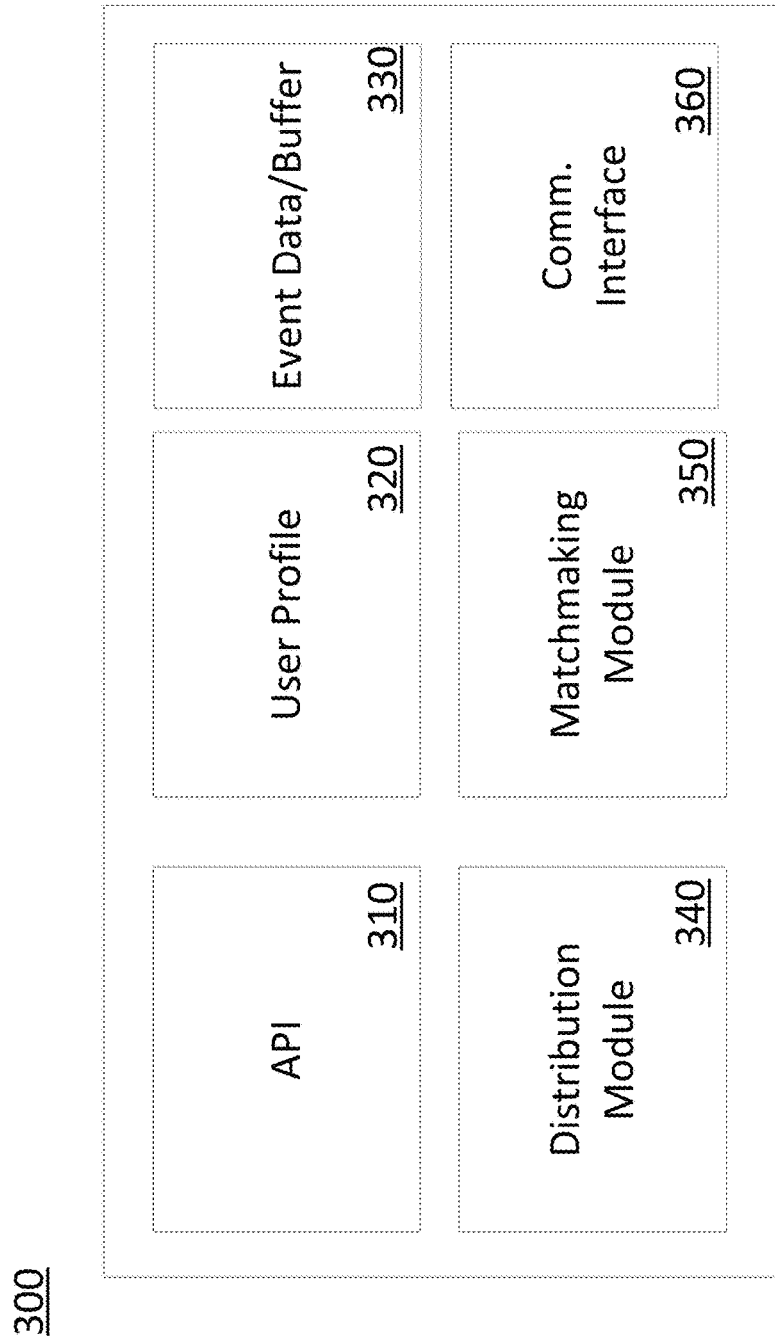
FIG. 3 is the gaming network of FIG. 1.

FIG. 3 is the gaming server 300 of FIG. 1. The gaming server 300 facilitates, for example, the distribution of the e-sport event data to remove viewers, choosing possible remote users to participate in the e-sport event, and establishing communication channels to allow for the remote user to participate. The gaming server 300 includes a plurality of different features that facilitates the creation of winning tournaments. As illustrated in the figure, the gaming server 300 may include an application program interface (API) 310, storage for user profiles 320, e-sport event data storage and buffer 330, distribution module 340, match making module 350, and communication interfaces 360. Details regarding each of these features will be provided below in further detail.

The application program interface (API) 310 allows an entity to customize and manage how the gaming server operates. For example, through the use of the API 310, an administrator (e.g. developer, tournament organizer) can modify how the gaming server distributes live e-sport event data to remote viewers and modify how the gaming server selects remote users to participate in the live e-sport event. The administrator can also (through the use of the API 310) modify the information stored within the gaming server such as information associated with the various user profiles 320 of the remote users.

Furthermore, any updates needed with respect to the features associated with the gaming server can be implemented using the API 310 as well. For example, various video games may obtain patches and or other fixes during the course of a live e-sport event or between live e-sport events. The API 310 can be used to modify features of the gaming server to incorporate those patches and other fixes as well so that issues that can affect distribution and communication with remote users are also addressed.

The user profile 320 is used to store information about each remote viewer. Remote viewers may need to create their own profile and sign in to their respective profiles before being allowed to access/view live e-sport event data and/or remotely participate in live e-sport events. The user profiles 320 would be used by the gaming server 300, for example, to identify eligible remote users to participate in the live e-sport events as well as establish the dedicated communication channels that would allow the remote users to participate.

In embodiments where people would need to purchase a ticket to attend the live e-sport event in person, remote viewers may also be required to purchase from one of many possible different tickets or purchase subscriptions in order to remotely view and/or participate in the live e-sport event. If there are different tickets or different status based on subscription types, the user profile 320 can store the information related to that remote user. There may be, for example, different features available for a user based on their status associated with a particular ticket and/or subscription purchase. If ticket A allows the remote user to just view the live e-sport event while ticket B allows the remote user to view and potentially remotely participate in the live e-sport event, information about the particular ticket purchased will be stored in the user profile 320.

The user profile 320 may also store user preferences about the live e-sport event distribution being remotely viewed on their user computing device. For example, the user profile 320 can customize preferred viewpoints, preferred additional information to be displayed, preferred commentators, and what advertisements they may be interested in that can be shown to the remote user during the course of the live e-sport event. The user profile 320 can be updated anytime by the respective user through their user computing device.

The user profile 320 can also store information about the user computing devices. This information can be used by the gaming server 300 to identify how the live e-sport event data can be processed and transmitted. This may identify, for example, the format the live e-sport event data would need to be transmitted as well as capabilities of the computing device. The distributed e-sport event data may be modified in order to be compatible with the user computing device.

The e-sport event data storage and buffer 330 is used to store e-sport event data coming from the event server. The e-sport event data storage and buffer 340 may be used to temporarily store the e-sport data until it can be processed and used in the distribution to the remote users.

The distribution module 340 manages the different channels that can be used to 1) distribute live e-sport event data to the remote users, 2) connect the remote players to the live e-sport event so that they can participate with minimal latency/delay, and 3) facilitate commentators in incorporating their commentary into the distributed live e-sport data. The distribution module 340, for example, performs the switch off of channels for the gaming server by informing the communication interface 360 when such switch off should be performed. With respect to the remote users, the distribution module 340 performs the switch between the distribution channel and player channel and vice versa as remote users are chosen to participate in the live e-sport event.

The distribution module 340 may track the characterization of each connected remote user (e.g. remote viewer, remote participant, commentator) and ensure that the appropriate communication channel is used for that remote user. When the characterization of a user changes, the distribution module 340 would inform the communication interface 360 to adjust accordingly.

The match making module 350 is used to identify possible remote users that can compete in the live e-sport event. Generally live e-sport events may include many different rounds played between pairs or teams of competitors. After each round, the winners and losers can be identified. In situations where the losers are removed from the live e-sport event and new competitors are needed (e.g. king of the hill style event), the match making module 350 may receive an indication that winners have been identified and that new competitors may need to be chosen.

The match making module 350 can then perform a query of all remote users and their associated user profiles 320 to find eligible users. If there are more eligible users than needed competitors, the match making module 350 can select from the eligible users in any number of different ways. For example, the match making module 350 can select from eligible users randomly. Random selection can also take into account weights based on external factors such as ticket/subscription purchase and social media (e.g. fan info). User skill can be used to rank eligible users and those remote users who have higher skill can be chosen next to participate in the live e-sport event.

When identified, the match making module 350 can provide the identified remote user to the distribution module 340 so that the communication channels can be established to facilitate in the remote user participation in the live e-sport event. Furthermore the match making module 350 may provide a notification to the identified remote user that they have been selected to participate in the live e-sport event and request authorization to proceed with connecting the remote user with the live e-sport event. If after a pre-set amount of time that the remote user does not authorize the connection, the remote user is unable to connect to the live e-sport event after a pre-set amount of time, or if the selected remote user rejects the opportunity to participate, a new remote user can then be chosen. The match making module 350 may repeatedly search for new remote users until one successfully connects to and is able to participate in the live e-sport event.

The communication interface 360 facilitates communication between the various features of the system of FIG. 1. For example, this would facilitate transmission of information from the event server to the gaming server as well as from the gaming server to the remote viewers. The communication interface 380 also facilitates user interactions (e.g. developer, commentators) with the gaming server.

The communication interface 360 would be responsible for providing the dedicated distribution, player, and commentator communication channels to the remote users for carrying out the present disclosure. The communication interface 360 would receive instructions from the distribution module 340 and the match making module 350 regarding what communication channels should be provided to which remote user.

FIG. 4 is a method 400 for creating winner tournaments with fandom influence. The tournaments are associated with live e-sport events. At various points in time during the course of the tournament, there may be a request for additional competitors to compete within the live e-sport event. The method 400 is able to identify remote users who are remotely viewing the live e-sport event, select eligible remote users to participate, and facilitate remote participation in the live e-sport event by the selected remote users.

In step 410, a tournament request may be received by the event server. The tournament requested may be associated with an administrator (e.g. developer) and encompass any number of competitors to be held at the live e-sport event venue. A tournament request may involve one or more game titles available through a gaming network associated with the event server, as well as may specify a variety of parameters for qualifying, rankings, and scheduling the participants in the live e-sport event. A player having a user account (or team having a team account) may register and have their data automatically shared with the event server for use in facilitating registration, rankings, promotions, awards, searches, and other tournament-related activities associated with the live e-sport event. The tournament request may further explain the ranking system, which may include any combination of gameplay metrics used to evaluate each registrant in a standardized way.

In step 420, past gameplay data may be tracked for the game titles specified in the tournament request. The particular metrics being tracked and evaluated may differ by game title and by parameters specified by the tournament organizer. Further, the parameters may be weighted differently based on preferences specified by the tournament organizer as well. In this way, each participant can be characterized regarding they skill level, for example, for the purpose of match making.

Once the live e-sport event has begun, registered players may participate in the tournament as normal. In some situations, a pre-determined number of losses may remove that player from the tournament. In other situations, some players may be unable to play in future rounds (e.g. sickness, injury). In this case, new participants (e.g. competitors) may be needed to fill in the newly vacated spots. In step 430, the method 400 identifies eligible remote users as possible fill-in challengers that can also remotely participate in the live e-sport event. The gaming server may process the skill level of each remote user and based on preferences specified by the tournament organizer, the gaming server can identify eligible remote users to be selected when needed. The gaming server can select eligible remote users based on any number of criteria such as by random, skill level, status (e.g. purchased a particular ticket or subscription) and social media connection (e.g. fan). The possible eligible remote users may be saved in a list and the list may be referred to by the gaming server as needed.

In step 440, matches of the tournament associated with the live e-sport event are initiated. Based on the generated rankings in step 420, competitors may be initially matched. Match-making may be performed, for example, based on similar skill level. In other embodiments, bracket style match making can be performed using rank so that the highest ranked player plays the lowest ranked player, the second highest ranked plays the second lowest ranked, etc.

In step 450, results of each match of the tournament are obtained. Results may include which players won as well as gameplay statistics associated with the match that concluded. Ranking of each of the players within the live e-sport event may be updated based on the results.

In step 460, winners of the previous match are matched with subsequent challengers. These challengers may be other players participating in the live e-sport event but may also include remote users that are needed to fill in vacated spots (e.g. previous players are unable to continue or are eliminated). The match-making used to select who the remote user should play against can be performed using the list of eligible remote users.

In a different embodiment, in particular exhibition (or non-competitive matches), match-making for next challengers can rely on social media information and fan-based information related to players participating in the live e-sport event. Competitive players participating in the live e-sport event could be paired against their fans that are among the eligible remote players who would like to participate. Handicaps can be implemented in situations where the skill level between the competitive player and their fan that is remotely playing can be introduced to make the match more even.

In step 470, the selected remote user is connected to the live e-sport event so that they can participate in the tournament. The connection may include providing a notification to the remote user that the remote user has been chosen and requesting authorization to establish the connection. The established connection used by the remote user to participate in the tournament may be different than the connection used to view the live e-sport event data (e.g. stream) on their computing device. In particular, a dedicated player connection is provided to the selected remote user in order to minimize latency and delay during participation in the tournament.

Other authorization steps may be used to ensure that the selected remote user is able to participate in the tournament. For example, verification of the status of the chosen remote user as being eligible (via their user profile) can be performed. Furthermore, detection of a compatible computing device and related video game used for the tournament may need to be satisfied. If such authorization steps are not satisfied within a pre-determined amount of time (or if the selected remote user declines on participating), a different remote user may be chosen.

Steps 440-470 may be repeated as many times as needed regarding selecting remote users and matching them with competitors within the live e-sport event until the tournament is completed.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. A method for creating tournaments, the method comprising:
    establishing an e-sport tournament having a plurality of participants;
    querying one or more remote spectators to identify eligible competitors for the e-sport tournament, wherein querying for eligible competitors includes searching for one or more keywords or phrases associated with the e-sport tournament;
    identifying a set of the spectators as eligible competitors based on one or more query results associated with gameplay statistics that meet criteria associated with the e-sport tournament, wherein the respective query results are stored in a user profile of each one of the set of spectators identified as eligible competitors;
    identifying that one of the participants is in need of a new competitor in real-time during the e-sport tournament; and
    selecting one of the set of spectators as the new competitor for the identified participant based on the user profile of the selected spectator corresponding to the identified participant.

2. The method of claim 1, wherein the user profile of the spectator includes gameplay statistics including at least one of access to a game title, an amount of time the spectator has spent playing the game title, progress or completion of the game title, in-game character information, and a level of one or more skills associated with the game title.

3. The method of claim 1, further comprising verifying an identity of the spectator before providing the spectator with access to the e-sport tournament.

4. The method of claim 1, wherein the user profile of the spectator is linked to one or more social media accounts of the spectator.

5. The method of claim 1, wherein the one or more keywords or phrases are associated with a positive or negative reaction to the identified participant.

6. The method of claim 1, wherein identifying the eligible competitors is further based on the user profile indicating a subscription, a purchased ticket, and a type of the purchased ticket.

7. The method of claim 6, further comprising verifying the subscription, purchased ticket, or the type of the purchased ticket.

8. The method of claim 1, further comprising establishing setting a handicap level based on a skill level of the identified participant and a skill level of the new competitor.

9. The method of claim 1, further comprising distributing a stream of a match between the identified participant and the new competitor, the stream including a video recording or a re-rendering of match based on extracted gameplay data.

10. A system for creating tournaments, the system comprising:
an event server that stores information regarding an e-sport tournament having a plurality of participants; and
a gaming server that:
queries one or more remote spectators to identify eligible competitors for the e-sport tournament, wherein querying for eligible competitors includes searching for one or more keywords or phrases associated with the e-sport tournament,
identifies a set of the spectators as eligible competitors based on one or more query results associated with gameplay statistics that meet criteria associated with the e-sport tournament, wherein the respective query results are stored in a user profile of each one of the set of spectators identified as eligible competitors,
identifies that one of the participants is in need of a new competitor in real-time during the e-sport tournament, and
selects one of the set of spectators as the new competitor for the identified participant based on the user profile of the selected spectator corresponding to the identified participant.

11. The system of claim 10, wherein the user profile of the spectator includes gameplay statistics including at least one of access to a game title, an amount of time the spectator has spent playing the game title, progress or completion of the game title, in-game character information, and a level of one or more skills associated with the game title.

12. The system of claim 10, wherein the gaming server further verifies an identity of the spectator before providing the spectator with access to the e-sport tournament.

13. The system of claim 10, wherein the user profile of the spectator is linked to one or more social media accounts of the spectator.

14. The system of claim 10, wherein the one or more keywords or phrases are associated with a positive or negative reaction to the identified participant.

15. The system of claim 10, wherein the gaming server identifies the eligible competitors further based on the user profile indicating a subscription, a purchased ticket, and a type of the purchased ticket.

16. The system of claim 15, wherein the gaming server further verifies the subscription, purchased ticket, or the type of the purchased ticket.

17. The system of claim 10, wherein the gaming server further sets a handicap level based on a skill level of the identified participant and a skill level of the new competitor.

18. The system of claim 10, wherein the gaming server further distributes a stream of a match between the identified participant and the new competitor, the stream including a video recording or a re-rendering of match based on extracted gameplay data.

19. A non-transitory computer-readable storage medium, having embodied thereon a program executable by a processor to perform operations comprising:
establishing an e-sport tournament having a plurality of participants;
querying one or more remote spectators to identify eligible competitors for the e-sport tournament, wherein querying for eligible competitors includes searching for one or more keywords or phrases associated with the e-sport tournament;
identifying a set of the spectators as eligible competitors based on one or more query results associated with gameplay statistics that meet criteria associated with the e-sport tournament, wherein the respective query results are stored in a user profile of each one of the set of spectators identified as eligible competitors;
identifying that one of the participants is in need of a new competitor in real-time during the e-sport tournament; and
selecting one of the set of spectators as the new competitor for the identified participant based on the user profile of the selected spectator corresponding to the identified participant.

* * * * *